April 25, 1967    P. F. CONDON ET AL    3,316,516
VARIABLE Q TRANSDUCER
Filed April 17, 1962

Inventors:
Patrick Francis Condon
Frederick Martin Gray
By Stevens, Davis, Miller & Mosher
Attorneys

3,316,516
VARIABLE Q TRANSDUCER

Patrick Francis Condon, Sutton Coldfield, and Frederick Martin Gray, Stafford, England, assignors to The English Electric Company Limited, London, England, a British company
Filed Apr. 17, 1962, Ser. No. 207,134
2 Claims. (Cl. 336—132)

This invention relates to variable Q transducers.

The object of the invention is to detect very small movements.

One aspect of the invention comprises a variable Q transducer comprising a closed core which is made entirely of magnetic material having high electrical resistivity, except for an insert of magnetic material of relatively low electrical resistivity, and an armature of magnetic material of high electrical resistivity which is located so as to bridge said insert and which is movable towards and away from said slice so as to vary the Q of the transducer.

The invention will be described with reference to an embodiment shown in the accompanying drawings, in which.

As will be described in more detail below, the transducer forms part of an oscillator tuned circuit, and its purpose is to create change of Q in the tuned circuit in response to movement of the high resistance shunt such that very small movements of the shunt give rise to change of Q sufficient to result in a detectable change of current in the transmission channel due to variation in resistance of the circuit. The resistance on which the operation depends is electrical resistance. Any small change in magnetic resistance or reluctance is incidental and plays no part in the operation.

If a transducer with a closed magnetic circuit entirely of high electrical resistance material such as a suitable ferrite material were incorporated in a tuned circuit, the Q of the circuit would be high.

Alternatively, a transducer with a closed magnetic circuit of low D.C. resistance material, such as unlaminated soft iron, has a low Q due to eddy current losses.

To apply a low resistance magnetic shunt to a high resistance circuit having an air gap will produce a massive change in Q even at some distance, due to flux leakage round the air gap, and is useless for the present purpose. Alternatively, a high resistance shunt on a low resistance circuit will have little effect at all, and no detectable difference in effect over small changes of air gap between circuit and shunt.

The problem has been to find a suitable combination of magnetic materials for the purpose in hand. A surprising solution has been found by utilising a high resistance shunt. The closed magnetic circuit itself consists of magnetic material such as a ferrite, having high resistance to direct current, with an insert of a material such as a mild steel, having a low direct current resistance but a fairly high magnetic permeability while the shunt is of a magnetic material such as a ferrite. The mild steel insert performs two functions. Firstly, the insert renders the Q of the unshunted magnetic circuit low, and secondly due to its permeability reduces the leakage flux, so that the moveable magnetic shunt does not affect operation when at some distance away. A very sensitive arrangement is thus achieved.

Associated with a suitable detector and signal circuit such a variable Q transducer will cause detectable signal variations in response to small movements of the shunt towards and away from the insert.

Figure 1:
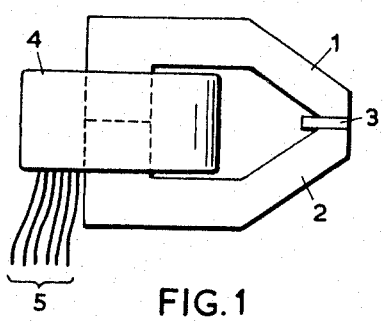
FIG. 1 shows the static portion of a variable Q transducer.

FIG. 1 shows the variable Q magnetic circuit or transducer assembly which is similar to a magnetic recording head, and comprises two like legs 1, 2, of magnetic ferrite material, which fit together through the coils 4 at one end, and embrace a thin insert 3 of mild steel at the other end. The coils 4 comprise three separate windings, with six terminal wires 5.

Figure 2:
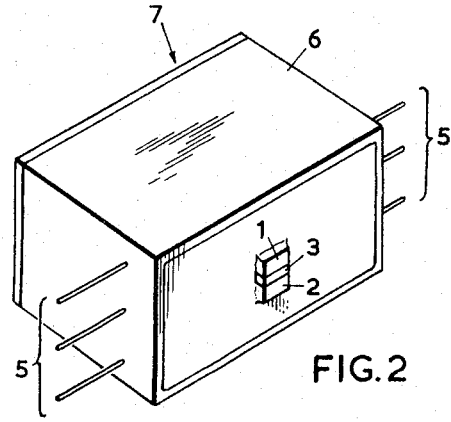
FIG. 2 shows the device of FIG. 1 after potting.

As shown in FIG. 2, the assembly is moulded within a box of suitable insulating material, with the wires 5 protruding, three at each end. The ends of the legs 1, 2 with the insert 3 protrude slightly from one side of the box.

Figure 3:
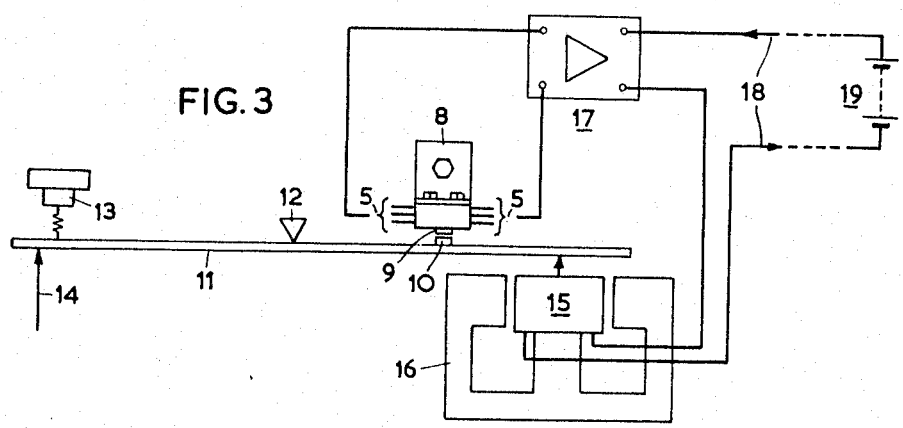
FIG. 3 shows diagramatically the complete displacement detector, including a shunt or flapper, incorporated in a force balance system.

The assembly 7 of FIG. 2 is mounted on a brass bracket 8, FIG. 3, on a fixed support, not shown, so that its protruding detector head 9 is adjacent a ferrite shunt or flapper 10 mounted on the non-magnetic beam 11 of a force balance system. The beam 11 is pivoted at 12. The variable force to be measured is applied at 14, and the zero position of the beam can be adjusted by the spring adjustment device diagrammatically indicated at 13.

The coils of the transducer 8, 9, 10, FIG. 3, are connected, as indicated diagrammatically in FIG. 3 to a displacement detector and signal circuit 17. The circuit 17 is connected to a two-wire transmission channel 18 which is connected at its far end to a power supply 19 and to a signal detector (not shown). Also included in the transmission channel is a feed-back coil 15 carried by the beam 11, and surrounding the centre pole of a permanent magnet 16 which has a circular air-gap similar to a loudspeaker and which constitutes a force motor. The motor 15, 16 is mounted below the right hand end of the beam 11 with the free ends of its legs adjacent the beam.

Any other suitable form of force motor could be used.

The force at 14, FIG. 3, due to a variable; e.g., that produced by a pressure measuring bellows or Bourdon tube; is balanced through the lever system 11, by the force produced by the signal current flowing through the coil of the force motor 15, 16.

Any unbalance between the two forces in the system causes a deflection of the beam 11 about its pivot 12. The displacement detector senses this movement and modifies the signal current to a value necessary to maintain equilibrium. It may be seen that the signal current is then proportional to the force produced by the pressure bellows or Bourdon tube, and may therefore be used for Remote Indication, Recording, Control, Data logging and any other function relevant to the system.

Additional embodiments of the invention in this specification will occur to others and therefore it is intended that the scope of the invention be limited only by the appended claims and not by the embodiment described hereinabove. Accordingly, reference should be made to the following claims in determining the full scope of the invention.

What we claim is:

1. A variable Q transducer consisting solely of a closed core which is made entirely of magnetic material having high electrical resistivity, except for an insert of magnetic material of relatively low electrical resistivity, a plurality of coils wound on the core and an armature of unmagnetized magnetic material of high electrical resistivity which is located so as to bridge said insert and which is mounted for automatic arbitrary movement towards and away from said insert which movement varies the Q of the transducer and provides a movement detection factor.

2. A transducer as claimed in claim 1 wherein said core is of ferrite, said insert is of mild steel, and said armature is of ferrite.

(References on following page)

References Cited by the Examiner

UNITED STATES PATENTS

| | | | |
|---|---|---|---|
| 2,469,266 | 5/1949 | Howell | 179—100.2 |
| 2,523,515 | 9/1950 | Porter | 179—100.2 |
| 2,535,712 | 12/1950 | Wolfe | 179—100.2 |
| 2,847,625 | 8/1958 | Popowsky | 318—28 |
| 2,883,538 | 4/1959 | Elam | 331—65 |
| 2,925,544 | 2/1960 | Long | 318—28 |
| 2,945,919 | 7/1960 | Neumann | 179—100.2 |
| 2,987,583 | 6/1961 | Camras | 179—100.2 |
| 3,015,077 | 12/1961 | Elam et al. | 331—65 |
| 3,034,026 | 5/1962 | Lichtgam | 317—175 |
| 3,069,602 | 12/1962 | Stout et al. | 317—165 |
| 3,074,279 | 6/1963 | Morris | 331—181 X |
| 3,102,217 | 8/1963 | Bullen | 318—28 |

ARTHUR GAUSS, *Primary Examiner.*

J. JORDAN, *Assistant Examiner.*